(12) United States Patent
Collier (10) Patent No.: US 6,772,237 B2
(45) Date of Patent: Aug. 3, 2004

(54) HOST CONTROLLER INTERFACE DESCRIPTOR FETCHING UNIT

(75) Inventor: Josh David Collier, Dracut, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 347 days.

(21) Appl. No.: 09/990,656

(22) Filed: Nov. 21, 2001

(65) Prior Publication Data

US 2002/0052987 A1 May 2, 2002

Related U.S. Application Data

(63) Continuation of application No. 09/759,959, filed on Jan. 11, 2001, now Pat. No. 6,324,597, which is a continuation of application No. 09/195,883, filed on Nov. 19, 1998, now Pat. No. 6,202,107.

(51) Int. Cl.[7] .............................................. G06F 13/00
(52) U.S. Cl. ........................... 710/22; 710/6; 711/213; 712/207
(58) Field of Search ..................... 710/5–6, 22–27, 710/33, 40, 241, 266; 711/154, 213, 134; 712/207, 233

(56) References Cited

U.S. PATENT DOCUMENTS

| | | | |
|---|---|---|---|
| 4,783,730 A | * 11/1988 | Fischer ......................... | 710/5 |
| 5,077,664 A | 12/1991 | Taniai et al. .................. | 710/22 |
| 5,283,883 A | 2/1994 | Mishler ........................ | 710/33 |
| 5,448,702 A | 9/1995 | Garcia, Jr. et al. .......... | 710/100 |
| 5,526,511 A | 6/1996 | Swenson et al. ............ | 711/134 |
| 5,606,665 A | 2/1997 | Yang et al. .................. | 711/154 |
| 5,644,784 A | 7/1997 | Peek ............................ | 710/24 |
| 5,655,114 A | 8/1997 | Taniai et al. ................ | 712/233 |
| 5,713,044 A | * 1/1998 | Gillespie et al. ............. | 710/22 |
| 5,794,073 A | 8/1998 | Ramakrishnan et al. ...... | 710/40 |

(List continued on next page.)

OTHER PUBLICATIONS

Patent Abstract of Japan, Pub No. 06096007, Pub Date: Apr. 8, 1994.

(List continued on next page.)

*Primary Examiner*—Christopher B. Shin
(74) *Attorney, Agent, or Firm*—Meyertons Hood Kivlin Kowert & Goetzel, P.C.; B. Noël Kivlin (57) ABSTRACT

The present invention relates to a method and circuit for prefetching direct memory access descriptors from memory of a computer system, and storing the prefetched direct memory access descriptors within a unified descriptor memory for subsequent access by direct memory access controllers. The descriptors are generated by a central processing unit of the computer system while executing software applications. The descriptors define data transfer operations between memory of the computer system and input/output devices via direct memory access controllers. The direct memory access controllers generate requests for descriptors. Upon generation of a request, the unified descriptor memory is checked to determine whether the requested descriptor is contained therein. If the requested descriptor is contained within the unified descriptor memory, the request descriptor is provided to the requesting direct memory access controller. If, however, the requested descriptor is not stored within the unified descriptor memory, the system memory is accessed for the requested descriptor, and the requested descriptor is transferred from system memory to the unified descriptor memory in a block of descriptors each relating to the same context. After the requested descriptor is stored within the unified descriptor memory, the requested descriptor is provided to the requesting direct memory access controller.

27 Claims, 4 Drawing Sheets

U.S. PATENT DOCUMENTS

| | | | | |
|---|---|---|---|---|
| 5,809,334 A | * | 9/1998 | Galdun et al. | 710/22 |
| 5,822,616 A | | 10/1998 | Hirooka | 710/22 |
| 5,825,774 A | | 10/1998 | Ready et al. | 370/401 |
| 5,828,901 A | | 10/1998 | O'Toole et al. | 710/22 |
| 5,854,911 A | | 12/1998 | Watkins | 712/207 |
| 5,870,627 A | | 2/1999 | O'Toole et al. | 710/52 |
| 5,905,912 A | | 5/1999 | Story et al. | 710/27 |
| 5,931,920 A | | 8/1999 | Ghaffari et al. | 710/5 |
| 5,978,866 A | | 11/1999 | Nain | 710/22 |
| 6,012,106 A | | 1/2000 | Schumann et al. | 710/22 |
| 6,012,120 A | | 1/2000 | Duncan et al. | 710/129 |
| 6,049,842 A | | 4/2000 | Garrett et al. | 710/33 |
| 6,065,100 A | | 5/2000 | Schafer et al. | 711/137 |
| 6,108,722 A | * | 8/2000 | Troeller et al. | 710/26 |
| 6,134,625 A | * | 10/2000 | Abramson | 710/241 |
| 6,145,016 A | | 11/2000 | Lai et al. | 710/4 |
| 6,163,820 A | * | 12/2000 | Garrett et al. | 710/33 |
| 6,166,724 A | | 12/2000 | Paquette et al. | 345/527 |
| 6,199,124 B1 | | 3/2001 | Ramakrishnan et al. | 710/40 |
| 6,202,107 B1 | | 3/2001 | Collier | 710/22 |
| 6,212,593 B1 | * | 4/2001 | Pham et al. | 710/266 |
| 6,275,877 B1 | * | 8/2001 | Duda | 710/23 |
| 6,324,597 B2 | | 11/2001 | Collier | 710/22 |
| 6,347,344 B1 | * | 2/2002 | Baker et al. | 710/20 |

OTHER PUBLICATIONS

International Search Report, App. No. PCT/US99/26790, mailed Mar. 31, 2000.

Promoters of the 1394 HCI: "1397–4 Open Host Controller Interface Specification," Release 1.00, Oct. 20, 1997, Copyright 1996, 1997; pp. ii–xiv; 1–170.

Promoters of the 1394 Open HCI; "1394 Open Host Controller Interface Specification," Release 1.00, Oct. 20, 1997; Copyright © 1996, 1997; pp. ii–xiv; 1–170.

Patent Abstract of Japan, Pub. No. 06096007, Pub. Date: Apr. 8, 1994.

International Search Report, App. No. PCT/US99/26790, mailed: Mar. 31, 2000.

* cited by examiner

HOST CONTROLLER INTERFACE DESCRIPTOR FETCHING UNIT

This application is a continuation application of U.S. patent application Ser. No. 09/759,959, filed Jan. 11, 2001, now U.S. Pat. No. 6,324,597 which is a continuation application of U.S. patent application Ser. No. 09/195,883, filed Nov. 19, 1998, now U.S. Pat. No. 6,202,107 issued Mar. 13, 2001.

BACKGROUND OF THE INVENTION

1. Field of the Invention

The present invention relates to the field of computer systems. More particularly, the present invention relates to a circuit and method for fetching descriptors used in direct memory access data transfers.

2. Description of the Relevant Art

Traditionally, computer systems include subsystems which interface to one another. Communication may include data transfers between memory and an input/output (I/O) device. Data transfers may occur in several ways. For example, in programmed I/O type transfers, all data transfers between memory and I/O devices are completely controlled by the central processing unit (CPU), or more precisely, by a program executed by the CPU. In interrupt I/O type data transfers, all data transfers between memory and I/O devices are initiated by the I/O device through interrupts. In response to I/O interrupts, the CPU suspends whatever it is currently doing and attends to the needs of the I/O device.

A third type of data transfer is known as direct memory access (DMA) data transfer. DMA is a specialized process that transfers data between memory and an I/O device via a direct memory access controller (DMAC), while the CPU continues with other tasks. In other words, all data transfers between memory and the I/O device is accomplished without involving the CPU. The DMA approach speeds overall system speed and generally provides a more efficient way of moving data between the memory and the I/O device.

In DMA transfers, the CPU generates descriptors used by the DMA controllers for transferring data between memory and I/O devices. Descriptors are, in essence, commands to the DMA controllers to transfer data to and from memory. DMA descriptors typically contain fields that identify memory location where data is to be transferred, the number of bits at that memory location to be transferred, and a pointer to a subsequent DMA descriptor. The descriptors are generated by the CPU executing software and temporarily stored in memory. Prior to data transfer, the DMA controllers must retrieve the descriptors from memory. Upon receipt descriptors, DMA controllers initiate data transfer in accordance thereto.

SUMMARY OF THE INVENTION

The present invention relates to a circuit and method for prefetching direct memory access descriptors from memory of a computer system. The descriptors are generated by a central processing unit of the computer system executing one or more software applications. In essence, the descriptors are commands that define a data transfer operation between memory and an input/output device. Once the descriptors are generated by the executed software applications, the descriptors are stored in memory for subsequent retrieval by direct memory access controllers.

The present invention prefetches and stores descriptors for a plurality of contexts within a unified memory for subsequent access upon request by the direct memory access controllers. To this end, the method involves reading a plurality of first descriptors from the memory of the computer system. Each of the plurality of first descriptors identifies a first address in the memory where data is to be written via a corresponding first direct memory access controller. A plurality of second descriptors is also read from memory. Each of the plurality of second descriptors identifies a second address in the memory where data is to be read via a corresponding second direct memory access controller. The plurality of first descriptors and the plurality of second descriptors are stored within a unified descriptor memory for subsequent access by the corresponding first and second direct memory access controllers.

The plurality of first descriptors is fetched from memory and stored within the unified descriptor memory in response to the corresponding first direct memory access controller generating a request for one of the plurality of first descriptors. Similarly, the plurality of second descriptors are fetched from memory and stored within the unified descriptor memory in response to the corresponding second direct memory access controller generating a request for one of the plurality of second descriptors.

Subsequent to fetching and storing the plurality of first descriptors and the plurality of second descriptors into the unified descriptor memory, one of the first or second direct memory access controllers may generate an additional request for a descriptor. Upon generation of the additional request, the unified descriptor memory is first checked to determine whether the additionally requested descriptor is contained therein. If the additionally requested descriptor is not contained within the unified descriptor memory, then the additionally requested descriptor is fetched from memory along with a block of other descriptors, and stored within the unified descriptor memory. Subsequent thereto, the additionally requested descriptor is forwarded to the requesting direct memory access controller from the unified descriptor memory.

BRIEF DESCRIPTION OF THE DRAWINGS

Other objects and advantages of the present invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
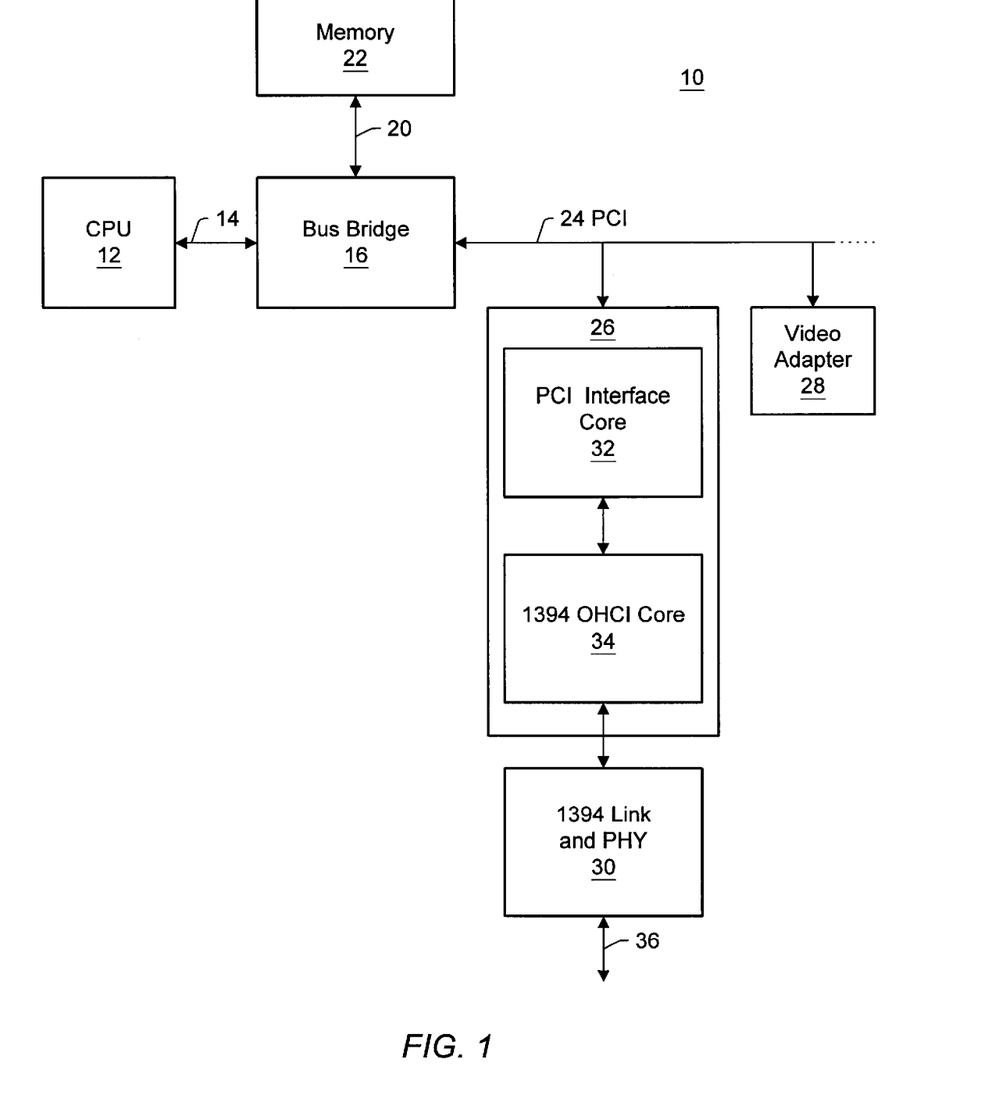
FIG. 1 is a block diagram of a computer system employing the present invention.

FIG. 1 is a block diagram of an example computer system employing one embodiment of the present invention. As illustrated in FIG. 1, the computer system 10 includes a central processing unit (CPU) 12 which is coupled to a bus bridge 16 through a CPU local bus 14. The bus bridge 16 includes memory control logic for local data transfer and is coupled to memory 22 via memory bus 20. Bus bridge 16 also interfaces to peripheral component interconnect (PCI) bus 24. FIG. 1 shows two PCI devices 26 and 28 coupled to PCI bus 24. PCI device 26 is defined by a PCI interface core 32 and a 1394 open host controller interface (OHCI) core 34. Cores 32 and 34 are coupled in series between PCI bus 24 and 1394 link 30. 1394 link 30 is coupled to 1394 bus 36. Multiple I/O devices may be coupled to the 1394 bus 36.

The 1394 OHCI core 34 is an implementation of the link layer protocol of the 1394 serial bus defined by the IEEE 1394-1995 high performance serial bus specification which is incorporated herein by reference. The 1394 OHCI 34 includes DMA engines for high performance data transfer between I/O devices coupled to the 1394 bus 36 and memory 22 via PCI bus 24.

The 1394 bus 36 and the 1394 OHCI core 34 support two types of data transfer: asynchronous and isochronous. The asynchronous and isochronous data transfers are further distinguished by type. Asynchronous data transfer places emphasis on guaranteed delivery of data between I/O devices coupled to the 1394 bus 36 and memory 32, with less emphasis on guaranteed timing. Isochronous data transfer is the opposite, with the emphasis on the guaranteed timing of the data, and less emphasis on delivery.

The 1394 OHCI core 34 can transmit and receive data packets defined by the 1394 standard. Packets to be transmitted are read out of memory 22 and received packets are written into memory 22, both using DMA transfer. The 1394 OHCI core 34 is capable of performing a cycle master function as defined by the 1394 standard. Conceptionally, the 1394 OHCI core 34 can support one DMA controller for each isochronous transmit and each isochronous receive. DMA controllers can be implemented to support up to 32 different DMA channels, referred to as DMA contexts. Further details of the 1394 OHCI core 34 can be found within the 1394 open host controller interface specification, 1996, 1997 provided by the promoters of the 1394 OHCI, which is incorporated herein by reference. The present invention will be described with application to the 1394 OHCI specification. However, it is to be understood that the present invention should not be limited thereto. Rather, the present invention has application to other systems in which data transfers between memory and I/O devices occur using DMA transfer defined by descriptors or other commands initiating the data transfer.

The 1394 OHCI specification describes the implementation of a minimum host controller implementation which consists of at least 12 descriptor based DMA controllers or contexts for the following functions:

Asynchronous request transmit,

Asynchronous response transmit,

Isochronous transmit (four contexts),

Asynchronous request receive,

Asynchronous response receive, and

Isochronous receive (four contexts).

A DMA controller (not shown in FIG. 1) is provided for each of the contexts identified above. As noted, descriptors generated by the software executing on the CPU 12, control the DNA controllers. These descriptors are temporarily stored within memory 22 for subsequent retrieval by the DMA controllers upon request. In the prior art, the DMA controllers retrieved the descriptors one at a time. Upon retrieval of the descriptors, the DMA controllers transfer data in accordance with variables contained within the descriptors. The present invention seeks to obtain higher DMA data transfer speed by reading or retrieving descriptors from memory 22 in large chunks versus the prior art method of reading descriptors from memory 22 one at a time. Further, each prior art DMA controller has a memory for storing corresponding descriptors. However, having a distinct memory in each DMA controller increases the size and complexity of the 1394 OHCI core 34. For example, since there are at least twelve different contexts requiring twelve different descriptors, at least 12 different memories within corresponding DMA controllers are needed for each context. The present invention seeks to unify descriptor storage and fetching operation, therefore reducing the size and complexity of the 1394 OHCI core 34. Thus, instead of having separate descriptor memory and separate logic gates for controlling access to the descriptor memory within each DMA controller, as in the prior art, the present invention provides a single descriptor memory (not shown in FIG. 1) for storing descriptors for each context used by various DMA controllers. Further, the present invention seeks to avoid fetching descriptors from memory 22 one at a time. Rather, the present invention fetches blocks of descriptors from memory 22 for storage in the unified descriptor memory in response to a request for a single descriptor from a DMA controller. Fetching blocks of descriptors reduces the number of transactions and latencies over PCI bus 24.

Figure 2:
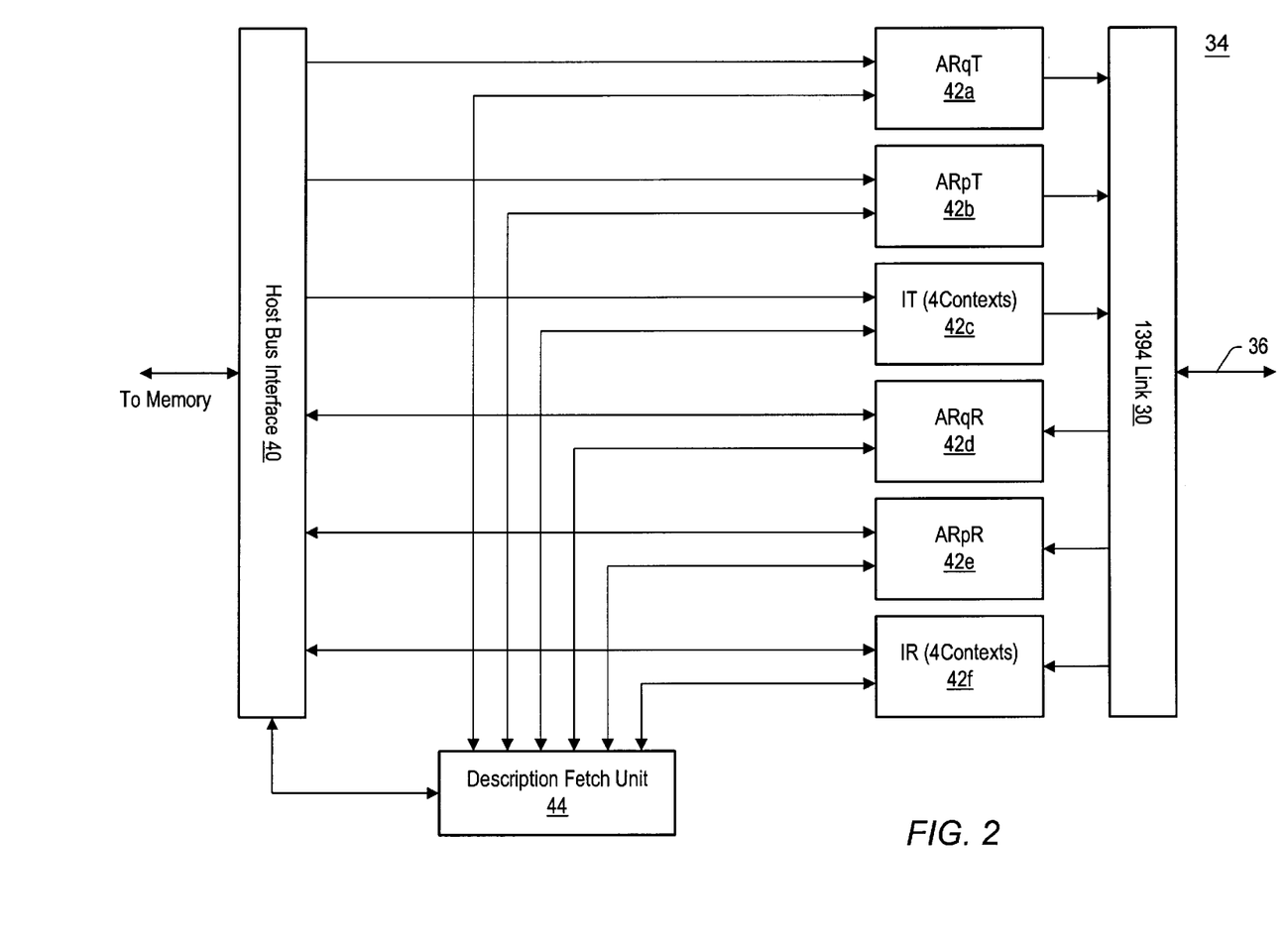
FIG. 2 is a block diagram of a host control interface shown in FIG. 1.

FIG. 2 is a block diagram of the 1394 OHCI core 34 shown in FIG. 1. The 1394 OHCI core 34 includes a host bus interface 40, DMA controllers 42a–42f, and descriptor fetch unit 44 operating in accordance with the present invention. Additionally, FIG. 2 shows the 1394 link 30 of FIG. 1. The host bus interface 40 is coupled to memory 22 via PCI interface core 32 and PCI bus 24 (not shown in FIG. 2). Further, host bus interface 40 is coupled to each of the DMA controllers 42a–42f and descriptor fetch unit 44. Descriptor fetch unit 44 is coupled to each of the DMA controllers 42a–42f. Each of the DMA controllers 42a–42f is coupled to the 1394 link 30.

DMA controller 42a defines the asynchronous request transmit context set forth above. DMA controller 42b defines the asynchronous response transmit set forth above. DMA controller 42c defines the isochronous transfer set forth above. Further, DMA controller 42c is understood to define four distinct contexts of isochronous transmit. DMA controller 42d defines the asynchronous request receive context set forth above. DMA controller 42e defines the asynchronous response receive context set forth above. Finally, DMA controller 42f defines the isochronous receive context set forth above. Further, DMA controller 42f is understood to define four distinct contexts of isochronous receive.

DMA controllers 42a–42f generate requests for descriptors used in transferring data between memory 22 and I/O devices coupled to the 1394 bus 36. Upon receipt of the descriptors, the DMA controllers initiate data transfer in accordance with the descriptors. Descriptor fetch unit 44 is provided to facilitate descriptor prefetching and processing for all 12 contexts in accordance with the present invention. More particularly, the descriptor fetching unit 44 is responsible for prefetching (i.e., reading from memory 22) and maintaining descriptors (i.e., flushing invalid descriptors) for all 12 contexts. Descriptor fetching unit 44 fetches and stores descriptors from memory 22 prior to DMA controller requests for the descriptors. The descriptors are stored within the descriptor fetching unit 44 until needed by requesting DMA controllers.

The descriptor fetch unit 44 operates in one of two modes, configurable for each individual context. In mode zero (strict-z), the descriptor fetch unit 44 fetches descriptors for a context using a z value of a command pointer of the particular context. The z value provides the number of descriptors in a current descriptor block stored in memory 22. The descriptor fetching unit 44 will fetch additional descriptors beyond those required in the current descriptor block to utilize optimal DMA burst sizes on the host bus. In mode one (contiguous), the descriptor fetch unit will use large DMA bursts to continually maintain descriptors available for context processing for descriptor lists which are contiguous in memory. Upon detecting a noncontiguous address, the descriptor fetching unit will flush all descriptors, and begin fetching descriptors from a new memory address. Additionally, the descriptor fetching unit 44 provides error reporting for each context. Errors are reported for host bus errors (illegal memory address or data parity failure) or for a loaded command porter whose z value is zero.

Generally, the descriptor fetch unit 44 operates to fetch and store groups of descriptors from memory 22 in response to requests from DMA controllers 42a–42f for individual descriptors. For example, a first plurality of descriptors from memory 22 corresponding to, for example, the asynchronous request transmit context set forth above, is fetched by and stored in descriptor unit 44 in response to the asynchronous request transmit DMA controller 42a issuing a request for a single descriptor. Each of these plurality of descriptors identifies an address within memory 22 where data is to be transferred via the corresponding asynchronous request transmit DMA controller 42a. The descriptor fetch unit 44 then fetches and stores a second plurality of descriptors corresponding to, for example, the asynchronous response transmit context in response to the asynchronous response transmit context DMA controller 42b issuing a request for a descriptor. Thus, the descriptor fetch unit 44 fetches and simultaneously stores descriptors corresponding to several contexts.

Subsequent thereto, the asynchronous request transmit DMA controller 42a may generate an additional request for a descriptor. Rather than access memory 22, the request is transmitted to the descriptor fetch unit 44. If the descriptor fetch unit 44 contains the requested descriptor, the requested descriptor is read from the descriptor memory of the descriptor fetch unit 44 and provided to DMA controller 42a. If the requested descriptor is not stored within the descriptor memory of the descriptor fetch unit 44, the requested descriptor is read from memory 22, stored within the descriptor memory of the descriptor fetch unit 44, and then provided to DMA controller 42a.

Figure 3:
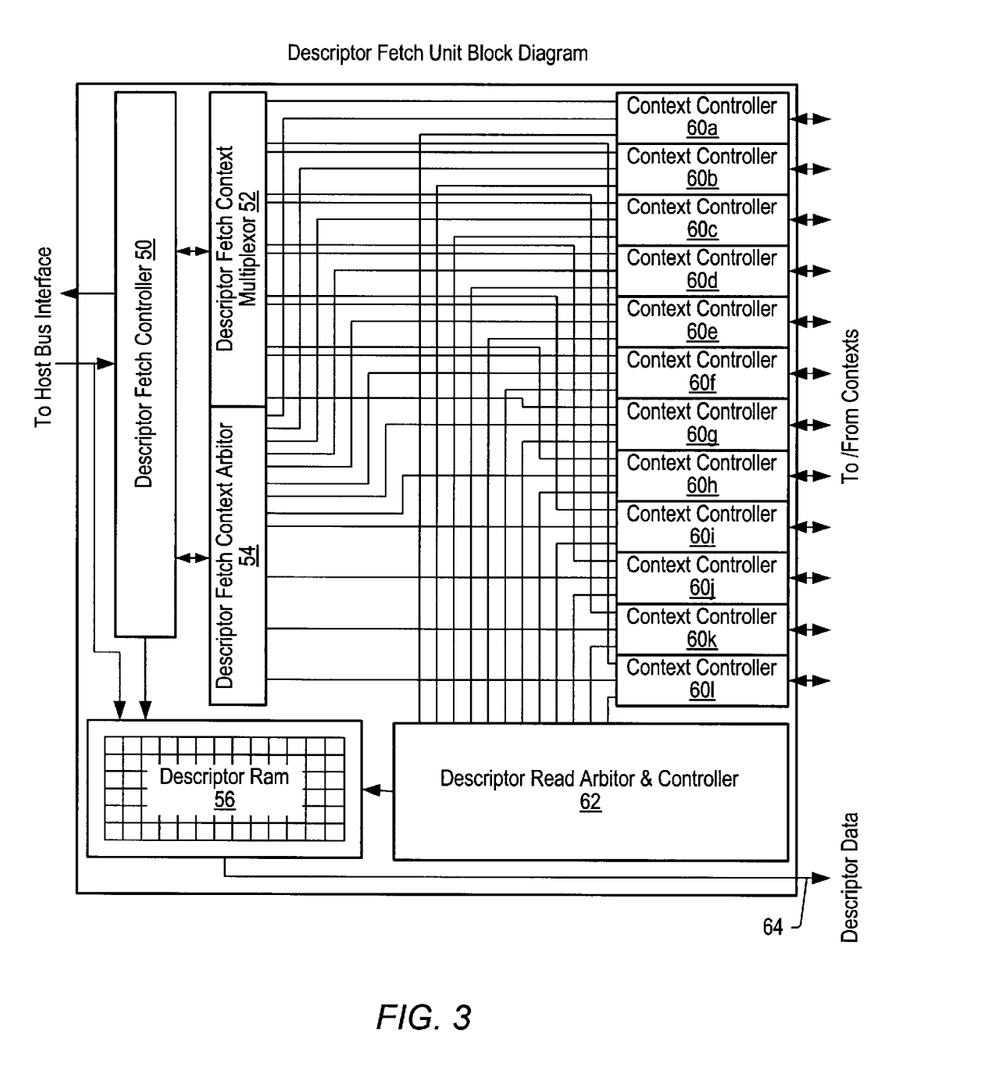
FIG. 3 is a block diagram of a descriptor fetch unit shown in FIG. 2.

FIG. 3 is a block diagram of one embodiment of the descriptor fetch unit 44 of FIG. 2 operating in accordance with the present invention. The descriptor fetch unit 44 of FIG. 3 includes a descriptor fetch controller 50, descriptor fetch context multiplexer 52, descriptor fetch context arbiter 54, descriptor memory 56, context controllers 60a–60l, descriptor read arbiter and controller 62, and descriptor output 64.

The descriptor fetch controller 50 is coupled to the host bus interface 40 (not shown in FIG. 3), the descriptor fetch context multiplexer 52, the descriptor fetch context arbiter 54, and the descriptor memory 56. It is noted that in the embodiment shown in FIG. 3, the descriptor memory 56 is defined by a random access memory type structure. The descriptor fetch context arbiter 54 and the descriptor fetch context multiplexer 52 are each coupled to context controllers 60a–l. The context controllers 60a–l are in turn coupled to descriptor read arbiter and controller 62. Finally, descriptor memory 56 is coupled to both the descriptor read arbiter controller 62 and descriptor output 64.

A request for a descriptor is generated and issued to one of the context controllers 60a–60l by one of the corresponding DMA controllers 42a–42f (not shown in FIG. 3). The descriptor request defines a pointer identifying a main memory address for the requested descriptor. The descriptor fetch unit 44 will issue a grant signal to the DMA controller requesting the descriptor when the requested descriptor is available on descriptor output 64. Shown below is the interface between the context controllers 60a–l and the DMA controllers 42 shown in FIG. 2.

| Context Interface At Descriptor Fetching Unit | |
|---|---|
| input mode | //Selects either Mode 0 (Strict-Z) or Mode 1 (Contiguous) |
| input command_pointer[31:0] | //Provided the command pointer to be loaded-qualified by load input |
| input run | //Enable context in arbitration for fetching and reading of descriptors |
| input load | //Strobed to load new command pointer into Context Contoller |
| input request | //Asserted to request acces to next descriptor |
| output grant | //Asserted when access to next descriptor is granted |
| output descriptor_data[63:0] | //Descriptor Data valid when grant is asserted |
| output processing_error | //Asserted upon detection of error, cleared upon deassertion of run input |

The descriptor fetch context arbiter 54 monitors the descriptor memory to identify contexts lacking descriptors stored within the descriptor memory 56. In the event the descriptor fetch context arbiter identifies a context which lacks descriptors within the descriptor memory 56, the descriptor fetch context arbiter assigns a fetch priority value to the next request seeking such a descriptor.

The descriptor fetch unit is coupled to the descriptor memory 56 and is configured to fetch blocks of descriptors from memory 22 for storage within the descriptor memory 56. The descriptor blocks are fetched by the descriptor fetch controller 50 in separate data transfers from memory 22. In each transfer, the descriptor fetch controller 50 transmits an address to memory 22, and memory 22 responds thereto by sending a block of descriptors for storage in descriptor memory 56. When descriptor fetch context arbiter assigns a highest priority value to a descriptor request, descriptor fetch context arbiter controls descriptor fetch context multiplexer 52 thereby muxing the descriptor fetch address assigned the highest in accordance thereto priority to fetch controller 50 from one of the context controllers 60a–l.

The context controllers 60a–l are configured to concurrently receive several descriptor requests from the DMA controllers. In response to concurrently receiving several descriptor requests, descriptor memory 56 sequentially transmits descriptors to the DMA controllers concurrently requesting descriptors. Descriptor read arbiter and controller 62 is configured to arbiter the access to descriptor memory 56 when context controllers 60a–l concurrently receive several descriptor requests.

Figure 4:
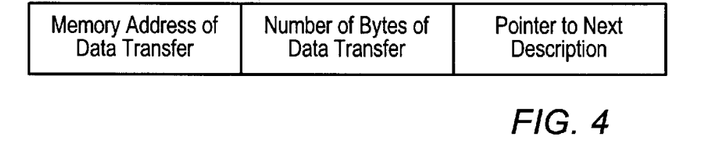
FIG. 4 illustrates the general contents of a typical descriptor.

FIG. 4 shows the general contents of a typical descriptor. More particularly, FIG. 4 shows that a general descriptor includes an address in memory where data is to be transferred, the number of bytes to be transferred at that memory address and a pointer to the next descriptor. Generally, descriptors of the same context are stored in contiguous locations in memory 22.

Figure 5:
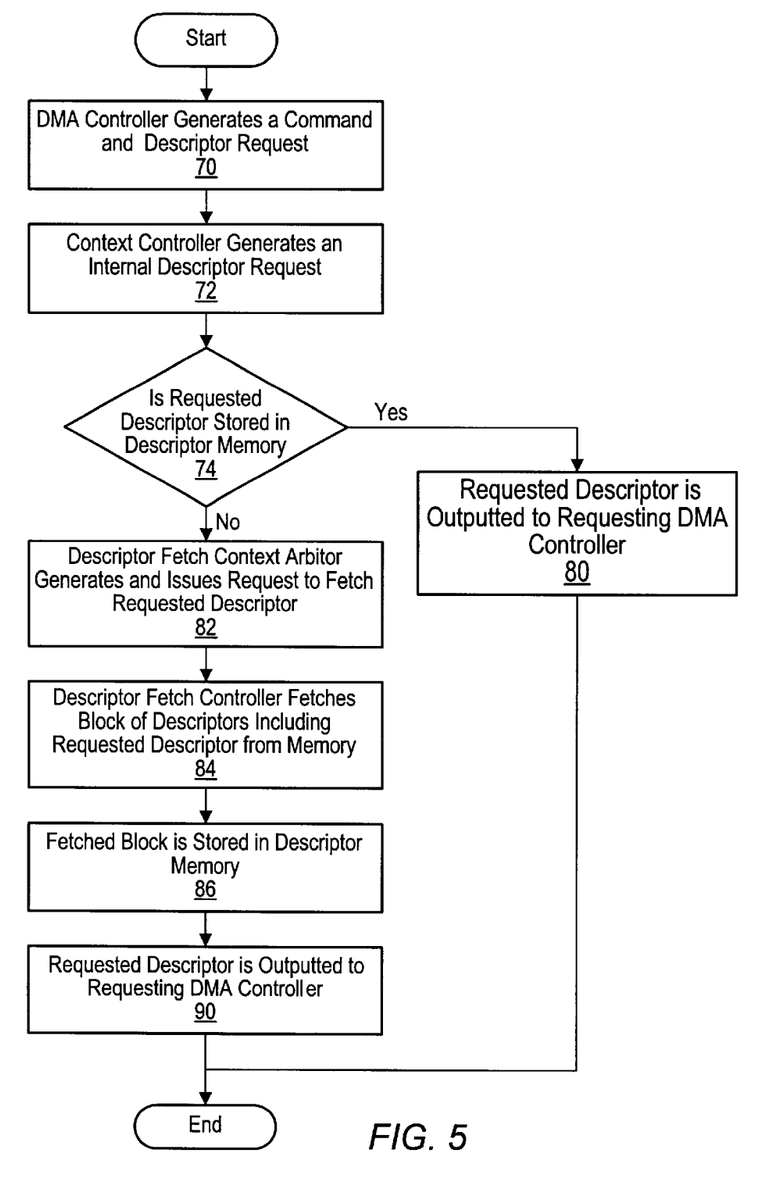
FIG. 5 is a flow chart illustrating operational aspects of the descriptor fetch unit shown in FIG. 3.

FIG. 5 is a flow chart illustrating operational aspects of the descriptor fetch unit shown in FIG. 3. At step 70, one of the context controllers 60a–l receives a descriptor request from a corresponding DMA controller. At step 72, the context controller receiving the descriptor request generates an internal descriptor request identifying the memory location of the requested descriptor. The internal request is provided to the descriptor read arbiter and controller 62, the descriptor fetch context arbiter 54 and the descriptor fetch context multiplexer 52. As shown in step 74, descriptor memory 56 is checked to determine whether the requested descriptor is stored therein. If the requested descriptor is within descriptor memory 56, then at step 80 the requested descriptor is read out of memory 56 and provided to the requesting DMA controller via descriptor output 64. However, if the requested descriptor is not within descriptor memory 56, descriptor fetch context arbiter 84, which is monitoring the contents of descriptor memory 56, generates a request to fetch the requested descriptor as shown in step 82. Descriptor fetch controller 50, on receipt of the fetch request from descriptor fetch context arbiter 54, initiates a fetch sequence whereby the requested descriptor and possibly additional descriptors of the same context are fetched in a block in a single data transfer from memory 22 and stored within a descriptor memory 56 as shown in steps 84 and 86. Thereafter, the requested descriptor is provided to the requesting DMA controller via the descriptor output 64 as shown in step 90.

Numerous variations and modifications will become apparent to those skilled in the art once the above disclosure is fully appreciated. It is intended that the following claims be interpreted to embrace all such variations and modifications.

What is claimed is:

1. A descriptor fetch unit comprising:
   a unified descriptor memory for storing descriptors; and
     a descriptor fetch controller coupled to said unified descriptor memory, wherein said descriptor fetch controller is configured to fetch a first plurality of descriptors corresponding to a first context in response to a first request, and wherein said descriptor fetch controller is configured to fetch a second plurality of descriptors corresponding to a second context in response to a second request, wherein said descriptor fetch controller is configured to store said first plurality of descriptors and said second plurality of descriptors in said unified descriptor memory, wherein said first plurality of descriptors and said second plurality of descriptors subsequently occupy said unified descriptor memory simultaneously.

2. The descriptor fetch unit of claim 1,
   wherein said first plurality of descriptors is fetched in a first single transfer, wherein the first single transfer is defined as sending a first address to a main memory and the main memory responding thereto by sending the first plurality of descriptors; and
   wherein the second plurality of descriptors is fetched in a second single transfer, where the second single transfer is defined as sending a second address to the main memory and the main memory responding thereto by sending the second plurality of descriptors.

3. The descriptor fetch unit of claim 1, wherein said descriptor fetch controller is further configured to respond to a request for a requested descriptor by searching the descriptor memory for the requested descriptor, wherein if the requested descriptor is found in the descriptor memory the descriptor fetch unit is configured to provide the requested descriptor from the descriptor memory, and wherein if the requested descriptor is not found in the descriptor memory the descriptor fetch unit is configured to: (i) read the requested descriptor from a main memory, (ii) store the requested descriptor within the descriptor memory, and (iii) provide the requested descriptor from the descriptor memory.

4. The descriptor fetch unit of claim 1, wherein said descriptor fetch controller is configured to flush said first plurality of descriptors from said descriptor memory, in response to detecting a request for a first descriptor corresponding to said first context and said first descriptor corresponds to a noncontiguous address.

5. The descriptor fetch unit of claim 1, wherein the descriptor memory is configured to transmit a descriptor from the descriptor memory to one of a plurality of direct memory access devices in response to the descriptor fetch unit receiving a descriptor request.

6. The descriptor fetch unit of claim 5 further comprising:
   a plurality of context controllers configured to receive descriptor requests from the plurality of direct memory access devices;
   a descriptor read arbiter and controller coupled between the descriptor memory and the context controllers, wherein the descriptor read arbiter and controller is configured to access the descriptor memory in response to one of the context controllers receiving the descriptor request.

7. The descriptor fetch unit of claim 6 wherein said context controllers are configured to concurrently receive a plurality of descriptor requests from the plurality of direct memory access devices, wherein the descriptor memory is configured to sequentially transmit descriptors to the plurality of direct memory access devices in response to the context controllers receiving the plurality of descriptor requests, and wherein the descriptor read arbiter and controller is configured to arbitrate descriptor memory access to the context controllers receiving the plurality of descriptor requests.

8. The descriptor fetch unit of claim 1, wherein the first plurality of descriptors are stored in contiguous locations in main memory, and wherein the second plurality of descriptors are stored in contiguous locations in main memory.

9. The descriptor fetch unit of claim 8 further comprising:
   a descriptor fetch context arbiter coupled to the context controllers and the descriptor fetch controller;
   wherein the context controllers are configured to concurrently receive a plurality of descriptor requests;
   wherein the descriptor fetch context arbiter is configured to assign a priority to each of the plurality of concurrently received descriptor requests;
   wherein the descriptor fetch context arbiter assigns a highest priority to a descriptor request for a descriptor which is not stored in the descriptor memory; and
   wherein the descriptor fetch controller fetches another plurality of descriptors from main memory for storage in the descriptor memory, wherein the another plurality of descriptors correspond to the descriptor request assigned the highest priority, wherein the another plurality of descriptors includes the descriptor which is not stored in the descriptor memory.

10. A method comprising:
    fetching a first plurality of descriptors corresponding to a first context, in response to a first request;

fetching a second plurality of descriptors corresponding to a second context, in response to a second request; and storing said first plurality of descriptors and said second plurality of descriptors in a unified descriptor memory, wherein said first plurality of descriptors and said second plurality of descriptors subsequently occupy said unified descriptor memory simultaneously.

11. The method of claim 10:

wherein the first plurality of descriptors is fetched in a first single transfer, wherein the first single transfer is defined as sending a first address to a main memory and the main memory responding thereto by sending the first plurality of descriptors; and wherein the second plurality of descriptors is fetched in a second single transfer, where the second single transfer is defined as sending a second address to the main memory and the main memory responding thereto by sending the second plurality of descriptors.

12. The method of claim 10, further comprising:

searching said unified descriptor memory for a requested descriptor in response to detecting a request for said requested descriptor;

in response to detecting said requested descriptor is in said descriptor memory, providing said requested descriptor from said descriptor memory; and in response to detecting said requested descriptor is not in said descriptor memory, (i) reading the requested descriptor from a main memory, (ii) storing the requested descriptor within said descriptor memory, and (iii) providing said requested descriptor from said descriptor memory.

13. The method of claim 10, further comprising flushing said first plurality of descriptors from said descriptor memory, in response to detecting a request for a first descriptor corresponding to said first context and said first descriptor corresponds to a noncontiguous address.

14. The method of claim 10, further comprising transmitting a descriptor from said descriptor memory to one of a plurality of direct memory access devices in response to said descriptor fetch unit receiving a descriptor request.

15. The method of claim 14 further comprising:

receiving descriptor requests from said plurality of direct memory access devices, wherein said descriptor requests are received via a plurality of context controllers; and accessing said descriptor memory in response to one of said context controllers receiving said descriptor request, wherein said accessing is by a descriptor read arbiter and controller coupled between said descriptor memory and said context controllers.

16. The method of claim 15 wherein said context controllers are configured to concurrently receive a plurality of descriptor requests from said plurality of direct memory access devices, wherein said descriptor memory is configured to sequentially transmit descriptors to said plurality of direct memory access devices in response to said context controllers receiving said plurality of descriptor requests, and wherein said descriptor read arbiter and controller is configured to arbitrate descriptor memory access to said context controllers receiving said plurality of descriptor requests.

17. The method of claim 10, wherein said first plurality of descriptors are stored in contiguous locations in main memory, and wherein said second plurality of descriptors are stored in contiguous locations in main memory.

18. The method of claim 17 further comprising:

receiving a plurality of descriptor requests, wherein said plurality of descriptor requests are concurrently received by said context controllers;

assigning a priority to each of said plurality of concurrently received descriptor requests, wherein said assigning is performed by a descriptor fetch context arbiter, and wherein said descriptor fetch context arbiter is coupled to said context controllers and said descriptor fetch controller;

wherein the descriptor fetch context arbiter assigns a highest priority to a descriptor request for a descriptor which is not stored in said descriptor memory; and wherein the descriptor fetch controller fetches another plurality of descriptors from main memory for storage in the descriptor memory, wherein the another plurality of descriptors correspond to the descriptor request assigned the highest priority, wherein the another plurality of descriptors includes the descriptor which is not stored in the descriptor memory.

19. A host controller interface coupled to a central processing unit, a memory, and an input/output device, wherein the host controller interface is configured to transfer data between the memory and the input/output device in accordance with descriptors generated by the central processing unit and stored in the memory, the host controller interface comprising:

a first direct memory access device, wherein the first direct memory access device is configured to transfer data from the input/output device to the memory, wherein the first direct memory access device is configured to generate requests for first descriptors corresponding to a first context;

a second direct memory access device, wherein the second direct memory access device is configured to transfer data from the memory to the input/output device, wherein the first direct memory access device is configured to generate requests for second descriptors corresponding to a second context;

a descriptor fetch unit comprising;

a unified descriptor memory for storing descriptors;

a descriptor fetch controller coupled to said unified descriptor memory, wherein said descriptor fetch controller is configured to fetch a first plurality of descriptors corresponding to said first context in response to a first request, and wherein said descriptor fetch controller is configured to fetch a second plurality of descriptors corresponding to said second context in response to a second request, wherein said descriptor fetch controller is configured to store said first plurality of descriptors and said second plurality of descriptors in said unified descriptor memory, wherein said first plurality of descriptors and said second plurality of descriptors subsequently occupy said unified descriptor memory simultaneously.

20. The host controller interface of claim 19, wherein said first plurality of descriptors is fetched in a first single transfer, wherein the first single transfer is defined as sending a first address to a main memory and the main memory responding thereto by sending the first plurality of descriptors; and wherein the second plurality of descriptors is fetched in a second single transfer, where the second single transfer is defined as sending a second address to the main memory and the main memory responding thereto by sending the second plurality of descriptors.

21. The host controller interface of claim 19, wherein said descriptor fetch controller is further configured to respond to a request for a requested descriptor by searching the descriptor memory for the requested descriptor, wherein if the requested descriptor is found in the descriptor memory the descriptor fetch unit is configured to provide the requested descriptor from the descriptor memory, and wherein if the requested descriptor is not found in the descriptor memory the descriptor fetch unit is configured to: (i) read the requested descriptor from a main memory, (ii) store the requested descriptor within the descriptor memory, and (iii) provide the requested descriptor from the descriptor memory.

22. The host controller interface of claim 19 wherein said descriptor fetch controller is configured to flush said first plurality of descriptors from said descriptor memory, in response to detecting a request for a first descriptor corresponding to said first context and said first descriptor corresponds to a noncontiguous address.

23. The host controller interface of claim 19 wherein the descriptor memory is configured to transmit a descriptor from the descriptor memory to one of said first direct memory access device or said second direct memory access devices in response to the descriptor fetch unit receiving a descriptor request.

24. The host controller interface of claim 23, wherein said descriptor fetch controller further comprises:
- a plurality of context controllers configured to receive descriptor requests from said first direct memory access device and said second direct memory access device; and
- a descriptor read arbiter and controller coupled between the descriptor memory and the context controllers, wherein the descriptor read arbiter and controller is configured to access the descriptor memory in response to one of the context controllers receiving the descriptor request.

25. The host controller interface of claim 24 wherein said context controllers are configured to concurrently receive a plurality of descriptor requests from said first direct memory access device and said second direct memory access device, wherein the descriptor memory is configured to sequentially transmit descriptors to said first direct memory access device and said second direct memory access device in response to the context controllers receiving the plurality of descriptor requests, and wherein the descriptor read arbiter and controller is configured to arbitrate descriptor memory access to the context controllers receiving the plurality of descriptor requests.

26. The host controller interface of claim 19, wherein the first plurality of descriptors are stored in contiguous locations in main memory, and wherein the second plurality of descriptors are stored in contiguous locations in main memory.

27. The host controller interface of claim 24, wherein said descriptor fetch controller further comprises:
- a descriptor fetch context arbiter coupled to the context controllers and the descriptor fetch controller;
- wherein the context controllers are configured to concurrently receive a plurality of descriptor requests;
- wherein the descriptor fetch context arbiter is configured to assign a priority to each of the plurality of concurrently received descriptor requests;
- wherein the descriptor fetch context arbiter assigns a highest priority to a descriptor request for a descriptor which is not stored in the descriptor memory; and
- wherein the descriptor fetch controller fetches another plurality of descriptors from main memory for storage in the descriptor memory, wherein the another plurality of descriptors correspond to the descriptor request assigned the highest priority, wherein the another plurality of descriptors includes the descriptor which is not stored in the descriptor memory.

* * * * *